Figure 1:
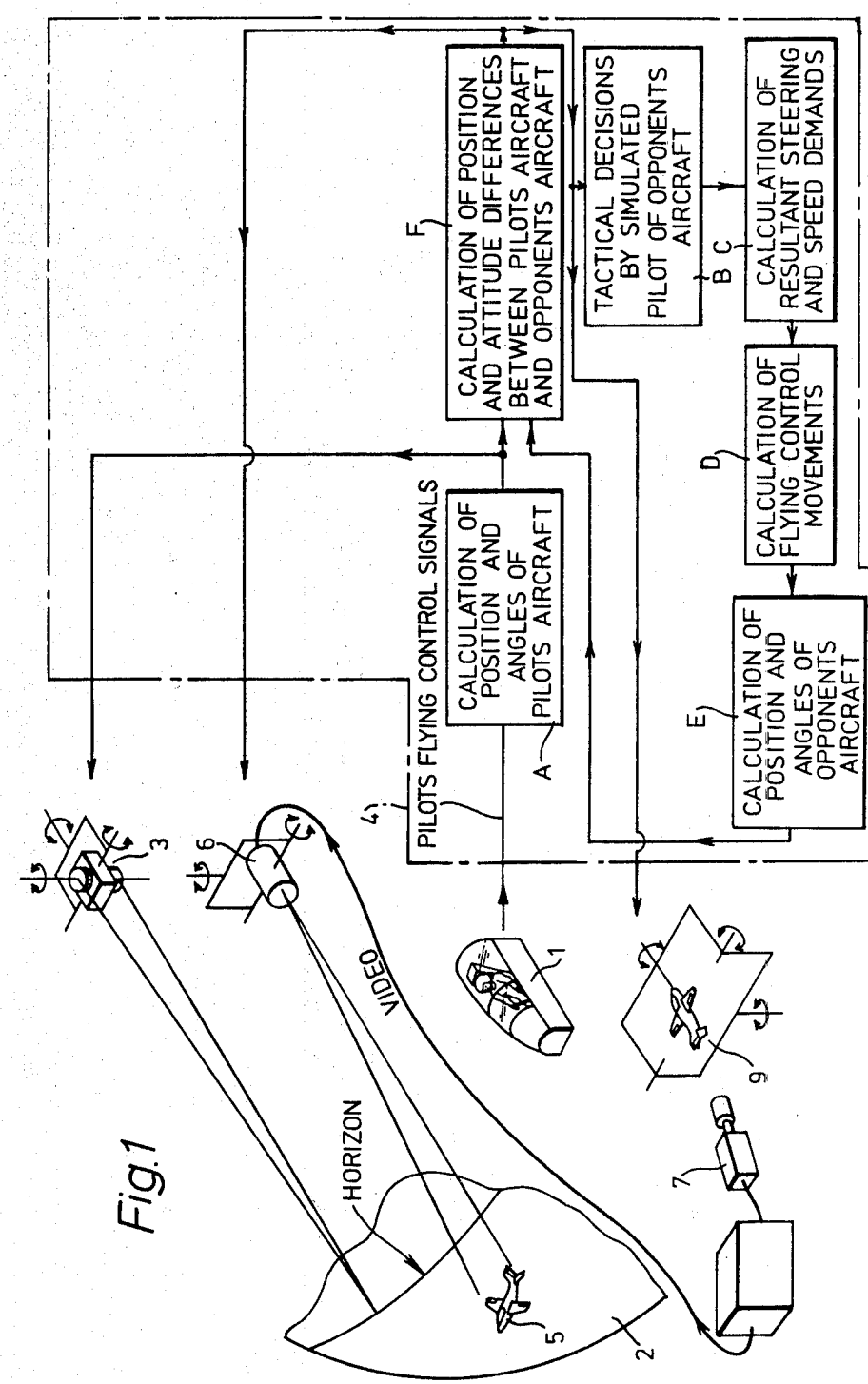

United States Patent [19]

Morrison et al.

[11] 4,352,664
[45] Oct. 5, 1982

[54] SIMULATOR HAVING TWO INDEPENDENTLY SERVO-CONTROLLED PROJECTION SYSTEMS

[75] Inventors: Jeffrey Morrison; Stanley R. E. Dixon; Arthur G. Barnes, all of Bristol, England

[73] Assignee: British Aerospace, Weybridge, England

[21] Appl. No.: 90,494

[22] Filed: Nov. 1, 1979

Related U.S. Application Data

[63] Continuation-in-part of Ser. No. 936,849, Aug. 25, 1978, abandoned.

[30] Foreign Application Priority Data

Aug. 27, 1977 [GB] United Kingdom ............... 36094/77

[51] Int. Cl.³ ........................... F41J 9/00; G09B 9/08; H04N 7/18
[52] U.S. Cl. ........................................ 434/14; 434/20; 434/44; 358/104
[58] Field of Search .................... 434/32, 38, 40, 43, 434/44, 14, 15, 20, 25, 26; 358/104, 81, 82

[56] References Cited

U.S. PATENT DOCUMENTS

| | | | |
|---|---|---|---|
| 3,233,508 | 2/1966 | Hemstreet | 434/44 |
| 3,457,365 | 7/1969 | Stokes et al. | 358/104 |
| 3,604,848 | 9/1971 | Driskell | 434/26 |
| 3,612,761 | 10/1971 | Wolff | 358/104 |
| 3,748,374 | 7/1973 | Curran et al. | 434/26 |
| 3,862,358 | 1/1975 | Wolff | 434/29 |
| 3,924,342 | 12/1975 | Pedlar et al. | 434/14 |
| 3,960,380 | 6/1976 | Yokoi | 273/311 |
| 4,106,218 | 8/1978 | Polstorff | 434/34 |
| 4,126,851 | 11/1978 | Okor | 273/85 G |
| 4,189,145 | 2/1980 | Stubben et al. | 434/26 |
| 4,276,028 | 6/1981 | Gwynn | 434/20 |

OTHER PUBLICATIONS

"Schmidt Objective Definition"; From *Van Nostrand's Scientific Encyclopedia;* 5th Edition; pp. 1968 & 1969; 1976.

*Primary Examiner*—Vance Y. Hum
*Assistant Examiner*—Leo P. Picard
*Attorney, Agent, or Firm*—Cushman, Darby & Cushman

[57] ABSTRACT

An air combat simulator including a part spherical screen, a remotely controlled horizon projector positioned so as to project onto the screen a scene consisting of sky and ground terrain, and a t.v. projection system for projecting onto the screen an image of an opponent's aircraft. A simulated manned aircraft consisting of a pilot's control station is positioned to view the screen and has flight controls arranged to generate flight control signals and a computer is arranged to control the horizon projector and opponent's aircraft image projector in dependence upon the flight control signals and upon a tactical decision making process programmed into the computer. To simulate range variation the size of the opponent's aircraft is varied by controlling the raster dimensions of a t.v. picture formed in the t.v. projection system, which system does not include a zoom lens.

4 Claims, 6 Drawing Figures

SIMULATOR HAVING TWO INDEPENDENTLY SERVO-CONTROLLED PROJECTION SYSTEMS

This application is a continuation-in-part of Ser. No. 936,849, filed Aug. 25, 1978, abandoned.

There have been several prior art proposals for air combat simulators. Generally, these comprise two domes, the interiors of which define spherical screens onto which images of target aircraft are projected. Within each dome is a simulated aircraft cockpit wherein sits a pilot and, by way of a computer, the control actions of each pilot are reflected in maneuvers of the target aircraft image projected onto the screen of the other dome. Thus, in effect, the two pilots are in combat with each other. One such combat simulator exists at the NASA Langley Research Center, Hampton, Va. and is described in the NASA publication NASA TN D-7304. It has also been proposed to replace one of the two pilots by software incorporated into the program of the target image control computer so that, in effect, the remaining pilot is in combat with the computer (NASA publications NASA CR-2582 and 2583).

In the prior proposals, the target image is produced by a t.v. projection system. A t.v. camera is arranged to observe a model of the target aircraft, the position of which model is controlled by computer driven servo-motors so as to vary the aspect of the model seen by the camera. Signals from the camera are fed via video signal processing circuitry to a fixed mounted cathode ray tube (CRT) projector which projects the image of the target aircraft model onto the screen via a servo-driven mirror system. The mirror system is controlled by the computer to vary the position of the projected image on the screen. To give the appearance of distance variations between the target aircraft and the pilot's aircraft, the camera and the projector are each fitted with a servo-driven zoom lens which, together, give a desired range of target image size.

A zoom lens is an expensive item of equipment—a servo-driven zoom lens of the size accuracy and range of magnification required for the projection system of the previously proposed combat simulators is an extremely expensive item and, with it, the projection system as a whole can easily account for the major part of the cost of the simulator. Further, such a lens is long and heavy—this is one reason why the t.v. projector is kept fixed and the target image position changed by a servo-driven mirror system. However, the use of such a mirror system introduces further expensive complexity into the projector in order to obtain correct focusing of the target image and also reduces the image brightness.

The object of this invention is to provide a combat simulator wherein the target or opponent aircraft is controlled by a computer and wherein the system for projecting the target image does not comprise any zoom lens. It is a further object to provide such a simulator wherein the target image projection system is substantially simplified and wherein no servo-driven mirror system is provided to change the target position.

Accordingly the invention comprises an air combat simulator including, in combination;

(i) a part spherical screen,
(ii) a simulated manned aircraft consisting of a pilot's control station positioned to view the screen and having flight controls operable for generating flight control signals,
(iii) a movably mounted horizon projector operable for projecting onto said screen a sky and ground terrain scene with first servo-motor means coupled to said horizon projector for steering the projector, and
(iv) a t.v. projection system operable for projecting onto said screen an image of an opponent's aircraft, the t.v. projection system comprising a movably mounted housing containing a cathode ray tube for forming a t.v. picture of said opponent's aircraft and focusing means for projecting said t.v. picture to form said image, second servo-motor means coupled to said housing for steering said housing to change the position of said image on said screen, and controllable deflection signal generating means connected to said cathode ray tube for varying the raster size of said t.v. picture and hence also the size of said projected image, and the air combat simulator further including:
(v) computer means connected to said flight controls, said first and second servo-motor means and said deflection signal generating means and operable to (a) calculate the position and attitude of the simulated manned aircraft as determined by said flight control signals and to steer said horizon projector accordingly, (b) to calculate the position and attitude of the opponent's aircraft based upon a combination of tactical decisions in turn based upon a calculation of the relative position and attitude of the two aircraft and to steer said housing of said t.v. projection system accordingly and (c) to calculate the relative size of the opponent's aircraft in accordance with the calculated range between the two aircraft and to vary the image size of the opponent's aircraft accordingly.

According to a further feature of the invention the image of the opponent's aircraft is produced by viewing with a t.v. camera the appropriate one of two steerable model aircraft, one of which is nose mounted and one of which is tail mounted, according to the relative simulated attitudes and positions of the manned aircraft and the opponents aircraft, the attitudes of the two models being controlled by the computer.

Figure 2:
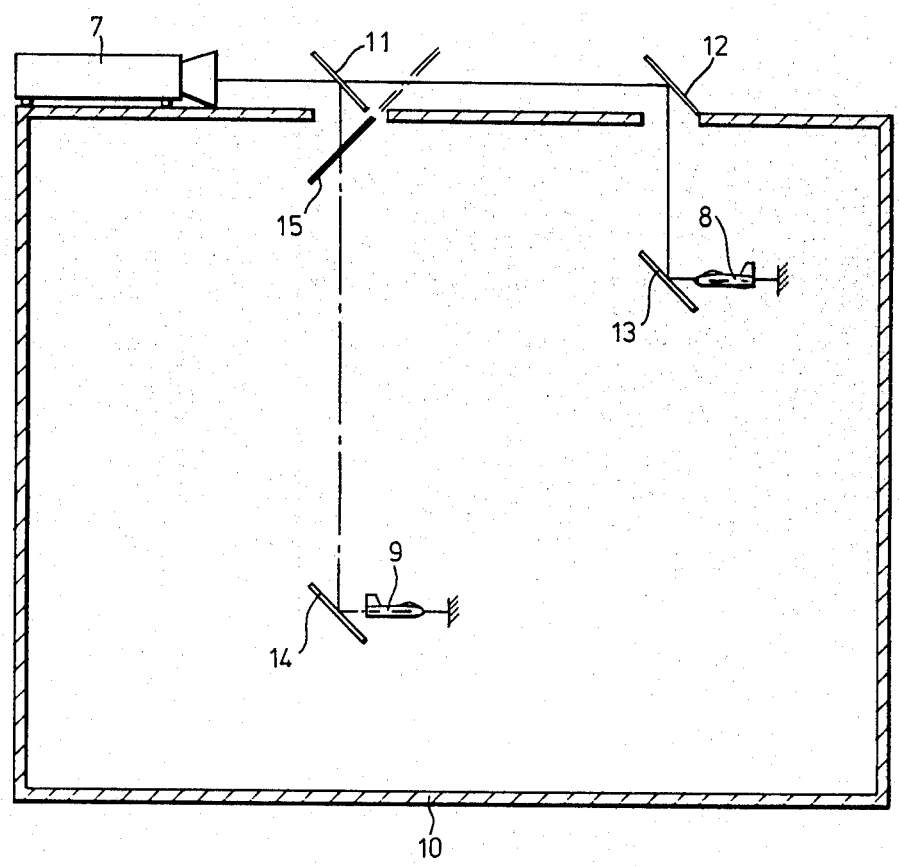
Figure 4:
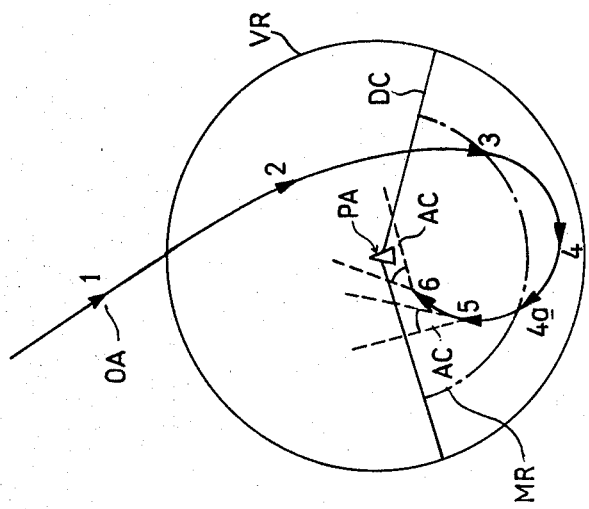
Figure 3:
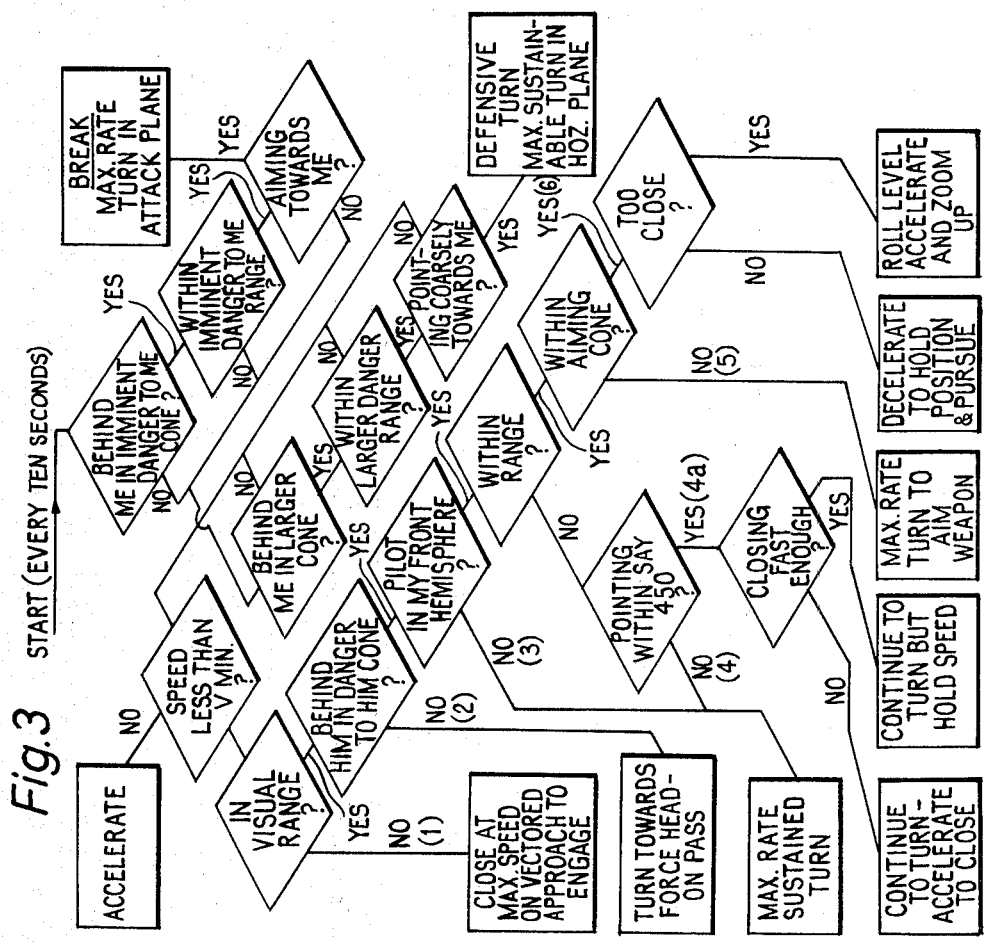
Figure 5:
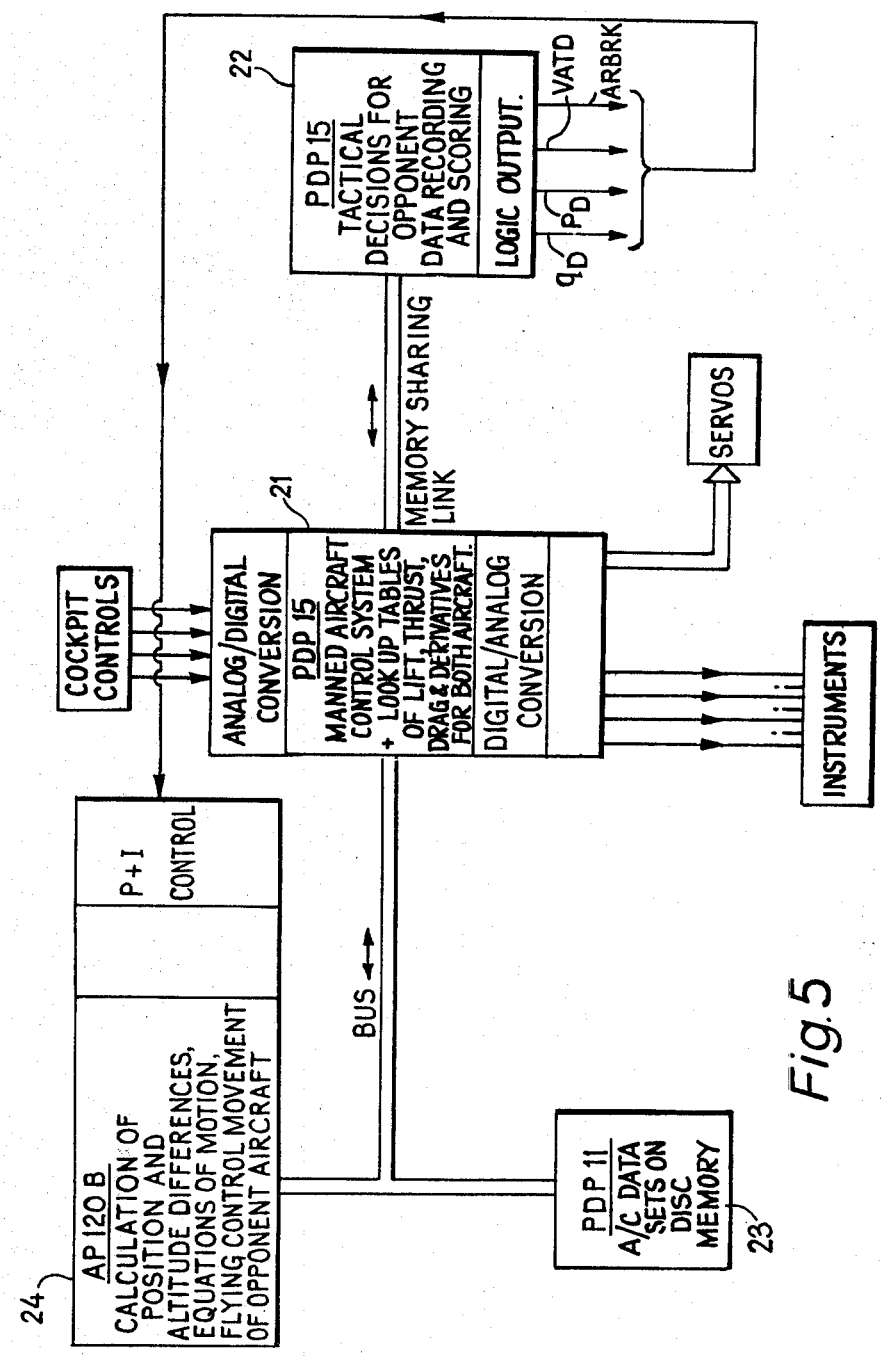
Figure 6:
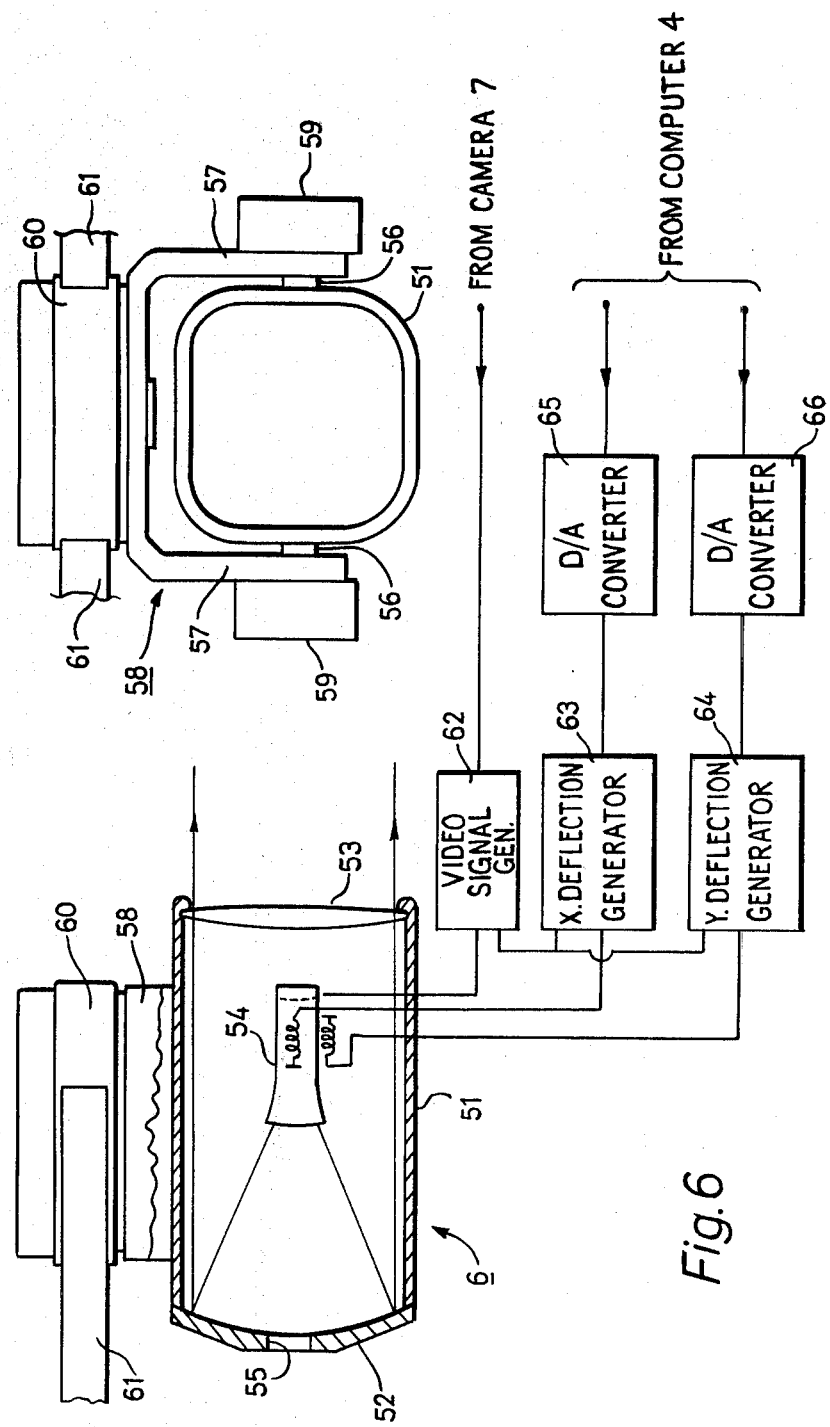

Further features of the invention will appear from the following description with reference to the accompanying drawings wherein:

FIG. 1 shows a diagrammatic representation of a preferred form of combat simulator according to the invention, FIG. 2 is a diagrammatic representation showing one arrangement for producing an image of the opponent's aircraft, FIG. 3 is a diagram demonstrating the basis for constructing part of a computer program for use in this invention, FIG. 4 is a diagram demonstrating the path which an aircraft might follow with a view to attacking a second aircraft, FIG. 5 is a layout of a computer installation which could be used for the invention, and FIG. 6 comprises a partly sectioned side view and an end view of a t.v. projector.

Referring now to FIG. 1, the simulated cockpit 1 of a manned aircraft having the usual flight controls (not shown) is positioned to view a spherical screen 2 onto which a scene consisting of sky and ground terrain separated by the horizon is projected by a servo-driven steerable projector 3 gimballed for movement about three euler axes. For the sake of clarity only part of the spherical screen 2 is shown. In practice the screen will be arranged substantially to surround the cockpit so as to provide maximum realism.

The flight controls in the cockpit 1 are arranged to generate flight control signals which are fed to a computer 4.

An image 5 of the opponent's aircraft is also projected on the screen 2 by a servo-driven steerable t.v. projector 6 gimballed for movement about two orthogonal axes. This image is produced by viewing with a t.v. camera 7 one or the other of two servo-driven model aircraft 8 and 9 only one of which is shown in this figure, the output from the camera being fed to the t.v. projector 6.

Referring now to FIG. 2 the t.v. camera 7 and the two model aircraft 8 and 9 are mounted upon a support structure 10 and the camera is arranged to view the models, one of which is nose mounted and the other tail mounted, through an optical screen consisting of a semi-reflecting mirror 11 and fully-reflecting mirrors 12, 13 and 14 in conjunction with a moveable shutter 15. With the shutter 15 in the position shown in full the t.v. camera views only the model 8 via the semi-reflecting mirror 11 and the fully-reflecting mirrors 12 and 13. With the shutter in the dotted position the t.v. camera views only the model 9 via the semi-reflecting mirror 11 and the fully-reflecting mirror 14. Both models are servo driven and mounted on gimbals for movement about three euler axes.

The computer 4 is arranged to calculate the position and attitude of the manned aircraft as indicated diagrammatically at Box A and to generate signals which are supplied to the servos of the projector 3 so as at all times to maintain the horizon in the position and attitude determined by the flight controls of the manned aircraft. The computer is also programmed to make tactical decisions of a simulated pilot in the opponent's aircraft as indicated at Box B and to calculate in Box C the resultant steering and speed demands.

The results of these calculations are fed to Box D where calculations of the flight control movements is effected and these results are fed to Box E where the position and attitude of the opponent's aircraft is calculated. The output from Box E is applied, together with the output from Box A, to Box F where the position and attitude differences between the two aircraft are calculated and appropriate steering signals applied to the servos of the projector 6 and the models 8 and 9. The output from Box F is also fed back to Box B. Variation of the image size of the opponent aircraft is achieved by variation of the raster size of the t.v. projector 6.

The full aerodynamic and performance characteristics of both aircraft are contained in the computer. The types of opponent aircraft can be rapidly changed by a combination of software change and by changing the models viewed by the t.v. camera. The shutter 15 in FIG. 2 is arranged to be controlled automatically by the computer so as to allow any aspect of the opponent aircraft to be produced, without obstruction by model supports, in the correct orientation relative to the simulated cockpit of the manned aircraft.

Thus, if the opponent aircraft is turned towards the manned aircraft, the tail mounted model is viewed by the camera. If the opponent aircraft is turned away from the manned aircraft, the nose mounted model is viewed by the camera. If the opponent aircraft is broadside on, the model that was previously being viewed, remains the model in view. There is also a small amount of hysteresis built into the logic system to stop the shutter "chattering", i.e. flipping from one light path to another, when the opponent aircraft is performing small pertubations about a mean broadside position.

From the foregoing it will be understood that the opponent is in the computer system which is arranged continually to compute target tactics and aircraft responses and update all displays in real time to create the most realistic air combat. The programs may also allow for automatic scoring, e.g. totalization of weapon release opportunities as determined within the computer, and data recording for subsequent playback, analysis and de-briefing. Being computer controlled, the opponent aircraft will also detect an error on the part of the manned aircraft so that tactics can be practiced until errors are removed. Another advantage of the simulator is its ability to allow the pilot of the manned aircraft to investigate his tactics against aircraft of different performance.

The part of the computer program which causes the simulated opponent's aircraft to appear to respond to the pilot's actions in a defensive way and even to perform agressive movements is constructed by analyzing what appears to be the best possible responses of the opponent's aircraft for different relative positions of the two aircraft so as to form a sequence of yes/no questions which can be asked about the relative positions and a corresponding series of responses. The actual responses are executed by the computer in dependence upon the values of a series of computer input parameters representing the capabilities of the particular aircraft simulated and the present speed and the height of the aircraft (as recorded by the computer from the previous course of the combat). FIGS. 3 and 4 demonstrate this manner of construction for a relatively simple case, although it will be appreciated that it could be made much more complex, for example, by breaking up the overall range of possible relative aircraft positions into smaller divisions, by discriminating conditions of danger from different weapons and so on.

For FIGS. 3 and 4, it is assumed that each aircraft carries heat-seeking missiles which, to be effective, must be able to see the engine exhaust of the aircraft at which they are fired. Thus, each aircraft has a cone-shaped danger space behind it from within, which the missiles of the other aircraft can see the exhaust. Also, the attacking aircraft has to be within range of the other aircraft before it can fire a missile and, since the missiles cannot change their direction of travel by more than a specified amount after they are fired, the attacking aircraft has to fire its missiles while it is pointing at least approximately towards the other aircraft, i.e., at firing, the other aircraft has to be within the space of an "aiming cone" extending forward from the attacking aircraft. It is assumed also that the first priority of the opponent's aircraft will be for self-preservation—this order of priority is obtained automatically by having questions about the level of danger to the opponent's aircraft first in the above-mentioned sequence. Thus, as shown in FIG. 3, the first question in the sequence is "is the pilot's aircraft behind me (the computer) in my imminent danger zone (from which the missiles of the pilot's aircraft can see my engine exhaust)?" If the answer to this question is "yes", the next question is asked which is "am I within range of his missiles?" If the answer to this question is "yes", the third question is asked, namely "is the pilot's aircraft aiming towards me?" If the answer to this question is "yes", the computer opts for a response which may be called a "break" and which comprises a max. rate turn within the attack plane to get out of the imminent danger situation as quickly as possible. If the answer to any one of the first three questions is "no", the opponent's aircraft will not be in imminent danger but may nevertheless be in a position for which a slightly less urgent defensive response is appropriate. This response called a "defensive turn" comprises a maximum sustainable turn within a horizontal plane and is appropriate if the pilot's aircraft is behind the opponent's aircraft within the space of a cone somewhat larger than the imminent danger cone, within a distance from which the pilot's aircraft might soon come within missile range and pointing at least coarsely towards the opponent's aircraft. If any one of these three conditions are not satisfied, the computer deems itself safe and goes on to consider a series of aggressive tactics which may be called a "dogfight". For this, the speed of the opponent's aircraft has to be greater than a minimum value V min.—if not, the opponent's aircraft is accelerated. If or when V min. is exceeded, the computer proceeds to the dogfight proper. For a description of this tactic, reference will also be made to FIG. 4 which shows a possible path of the opponent's aircraft OA towards the pilot's aircraft PA from outside the range VR of visual contact to within that range and then on into a position from which the opponent's aircraft threatens the pilot's aircraft.

A series of positions, referenced 1 to 6, of the opponent's aircraft along the path are shown, the reference numerals being shown also at appropriate positions in FIG. 3. The danger cone for the pilot's aircraft is referenced DC, the range of the opponent's missiles is MR and the aiming cone for the opponent's missiles is AC (shown for positions 5 and 6 of the opponent's aircraft). Therefore, the first question asked in the dogfight sequence is "is the pilot's aircraft in visual range?" If not (position 1), the opponent's aircraft is made to make a vectored approach at maximum speed to close with the pilot's aircraft. If or when the two aircraft are within visual range, there is asked "am I behind the pilot's aircraft within his danger zone?" Initially, the answer to this question will be "no" (position 2 in FIG. 3), and the opponent's aircraft is caused to turn towards the pilot's aircraft with a view to forcing a head-on pass. The series of questions continues with "is the pilot's aircraft within the hemisphere in front of me?" "is he within range?" and "is he within my aiming cone?" with appropriate subsidiary questions and responses as shown in FIGS. 3 and 4. At position 6, if it is achieved, a score is registered for the opponent. A final question in the sequence ensures that the opponent's aircraft does not get too close to the pilot's aircraft or, if it is already too close, causes the opponent's aircraft to rapidly climb.

It will be appeciated that for some of the positions of the opponent's aircraft shown in FIG. 4, it may not in fact be visible to the pilot or even projected by the t.v. projector—this depending on the range of movement of the t.v. projector 6 in FIG. 1 and the extent behind the pilot of any supporting structure which may be provided for the pilot's cockpit, the t.v. projector and the projector 3. Nevertheless, within the computer, the simulation of the flight of the opponent's aircraft on the basis described is continued so as to enable scoring to be performed and to maintain an up to date record of the position, speed and such of the opponent's aircraft. It will be appreciated also that the pilot will normally be trying to get his aircraft into a position which threatens the opponent's aircraft or, during the dogfight sequence described, will be trying to get out of danger himself. Within the computer, the described sequence of questions will be run through continually, starting every ten seconds for example, so that, as the position of the pilot's aircraft changes, the combat develops in a much more complex way that is implied by FIG. 4.

The translation of the program basis described into an actual computer program is a mechanical task which will be well known to those skilled in the art of computer programming.

The construction of those parts of the computer program which correspond to the functions A and C to F is already within the capability of those skilled in the art. Information about this may be found in publications issued by the NATO Advisory groups for aerospace research and development (AGARD) and by NASA, for example the NASA publications mentioned earlier herein.

Referring to FIG. 5, a computer installation which has been found to be suitable for the described combat simulator comprises two Digital Equipment Corporation PDP 15 computers 21 and 22 having memory capacities of 48 and 64 K. words respectively. These two computers are effectively formed into one by providing a memory sharing link between them. A PDP 11 computer 23 having an 8 K capacity is linked to the computer 21 and to a Floating Point Systems Inc. AP 120 B array processor 24 by way of bus-lines.

Generally, the computer 22 performs the function B of FIG. 1 and also calculates the score and records this and other data associated with a combat sequence onto a disc memory. As a result of the tactical decisions, the computer 22 produces a series of signals representing responses called for or demanded by the imaginary opponent. By way of example, these may include pitch, roll and speed demands $q_D$, $P_D$ and $V_D$ and also the position of an airbrake ARBRK which may be provided on the opponent's aircraft simulated. These signals are fed via an output stage of the computer 22 to an input stage of the processor 24. This input stage comprises a series of controllers in which the demand signals are compared with signals representing already existing parameters such as speed, climb rate, roll rate and so on so as to form difference signals representing a comparison of the existing and demanded parameters. Depending upon the parameter processed, some of the controllers will comprise proportional plus integral controllers, for example the controllers which process the pitch and roll demands $q_D$ and $p_D$. The computer 21 performs the function A of FIG. 1. It receives a series of analog demand signals from the pilot's cockpit controls, and after converting them to digital signals, compares them with signals representing already existing parameters which have been recorded by the computer, so as to form difference signals. The computer then modifies its recorded parameters to reduce the difference signals at rates appropriate to the pilot's aircraft being simulated. This computer also outputs via digital to analog converters signals which are fed to instruments mounted in the pilot's cockpit, so that these instruments will indicate parameter values appropriate to the attitude and such of the pilot's aircraft, and also signals for controlling the servos which drive the projectors and opponent aircraft models.

The processor 24 in association with the computer 23 generally performs the functions C, D, E, and F of FIG. 1.

Referring to FIG. 6, the t.v. projector 6 comprises a housing 51 at one end of which is a concave mirror 52 and at the other end of which there is a transparent plate 53 made of plastics material. Within the housing, fixed by support means (not shown) along the focal axis of the mirror 52, is a high-intensity projection cathode ray tube 54. The tube may have a screen diameter of 5 inches for example. The picture formed on the screen of the tube 54 is reflected by the mirror 52 back past the tube 54, through the plate 53 towards the spherical screen 2 (not shown in FIG. 6). The plate 53 is profiled to correct aberrations of the image projected onto the screen and to provide some additional focusing of the image. The diameter of the tube 54 is small in relation to that of the mirror 52 so its presence between the mirror and the plate 53 does not significantly affect the image. It means, in fact, that the center portion of the mirror 52 is unnecessary so the mirror can have a hole 55 at its center to admit cooling air towards the screen of the tube. A fan (not shown) could be provided to assist the flow of this cooling air. Short stub-shafts 56 extend outwardly from opposite sides of the housing 51 and are supported for rotation by bearings (not shown) mounted in two downwardly depending legs 57 of a frame member 58. The stub-shafts are coupled to the rotors of two servo-motors 59 which operate in concert to turn the stub-shafts and hence also the t.v. projector 6 about a horizontal axis under the control of the computer installation 4. The frame member 58 is coupled to the rotor of a further servo-motor 60 of which the housing is fixed to a stationary mounting plate 61 forming part of a support gantry (not shown) arranged behind the cockpit 1 in FIG. 1. The servo-motor 60 is controlled by the computer to rotate the frame member 58 and hence also the projector 6 about a vertical axis.

In order to produce a picture on the screen of the cathode-ray 54, the tube is fed with modulation signals from a video signal generator 62 which in turn receives picture representative signals from the camera 7 in FIG. 1. The deflection coils of the tube 54 receive sawtooth raster generating signals from X and Y deflection signal generators 63 and 64, which generators are such that the amplitudes of the sawtooth signals produced thereby can be varied by the computer installation 4 by way of digital to analog converters 65 and 66. These control signals are formed by the computer installation 4 in response to a program instruction to supply signals representative of the distance between the two aircraft as calculated by the computer installation. As a result, the raster size at the screen of the tube 54 and hence also the size of the image projected onto the spherical screen 2 in FIG. 1 is varied in accordance with the calculated distance.

Clearly, it is not possible for the pilot's cockpit and the t.v. projector 6 to be both located at the centre of curavture of the spherical screen 2—at least one, perhaps both, has to be off-center and so the size of the projected image or the pilot's view of it may vary with the position of the image upon the screen 2. Therefore, as a further refinement of the computer program, the variation in image size as seen by the pilot with change in position of the image on the screen 2 can be analyzed and the computer instructed to modify the control signals fed to the deflection generators 63 and 64 so as to counteract this variation.

We claim:

1. An air combat simulator including, in combination:
   a part spherical screen;
   a simulated manned aircraft consisting of a pilot's control station positioned to view the screen and having flight controls operable for generating flight control signals;
   a movably mounted horizon projector operable for projecting onto said screen a sky and ground terrain scene;
   first servo-motor means coupled to said first projector for steering the projector;
   a t.v. projection system operable for projecting onto said screen an image of an opponent's aircraft, the t.v. projection system comprising a movably mounted housing containing a cathode ray tube for forming a t.v. picture of said opponent's aircraft, focusing means for projecting said t.v. picture to form said image, second servo-motor means, independent from said first servo-motor means, coupled to said housing for steering said housing to change the position of said image on said screen, and controllable deflection signal generating means connected to said cathode ray tube for varying the raster size of said t.v. picture and hence also the size of said projected image; and
   computer means, connected to said flight controls, said first and second servo-motor means and said deflection signal generating means, for (a) calculating the position and attitude of the simulated manned aircraft as determined by said flight control signals and steering said horizon projector accordingly, (b) calculating the relative position and attitude of the two aircraft, (c) making tactical decisions concerning the path of the opponent's aircraft relative to the sky and ground terrain scene based on the relative positions and attitudes of the two aircraft, (d) calculating the position and attitude of the opponent's aircraft based upon a combination of the tactical decisions and the relative position and attitude of the two aircraft and steering said housing of said t.v. projection system accordingly, and (e) calculating the relative size of the opponent's aircraft in accordance with the calculated range between the two aircraft and to vary the image size of the opponent's aircraft accordingly.

2. An air combat simulator according to claim 1, wherein said t.v. projection system includes, to produce picture signals for said cathode ray tube, housing means containing two steerable model aircraft, one of which is nose mounted and the other of which is tail mounted, servo-motor means connected to said computer means and coupled to the model aircraft for altering the attitudes thereof within the housing means under the control of said computer means in dependence upon the relative calculated attitudes and positions of the manned aircraft and the opponent's aircraft, a t.v. camera positioned for viewing the model aircraft and connected to said cathode ray tube for supplying said picture signals thereto, and movable shutter means controlled by said computer means for ensuring that only one of said model aircraft can be seen by said camera at any one time.

3. An air combat simulator according to claim 1, wherein said focusing means comprises a concave mirror mounted at least near to one end of said movably mounted housing and a profiled transparent member positioned at least near to the other end of said housing to receive light from said mirror and to transmit a corrected image towards said screen, said cathode ray tube being mounted within said housing between said housing and said profiled transparent member with the screen of the cathode ray tube facing the mirror and the cathode ray tube having overall cross-sectional dimensions substantially less than those of the mirror and the transparent member.

4. An air combat simulator according to claim 1, wherein said housing is mounted, for turning about a horizontal axis, between downwardly depending leg portions of a frame member, there being two servo-motors mounted upon said downwardly depending portions and coupled to said housing for turning it about said horizontal axis and said frame-member being connected to the rotor of a further servo-motor of which the stator is fixed with respect to a fixed support above said pilot's control station, the further servo-motor being operable for turning the frame member and the housing about a vertical axis.

* * * * *